United States Patent
Choi et al.

(10) Patent No.: US 10,658,658 B2
(45) Date of Patent: May 19, 2020

(54) NEGATIVE ELECTRODE ACTIVE MATERIAL, METHOD OF PREPARING THE SAME, NEGATIVE ELECTRODE INCLUDING THE SAME AND LITHIUM SECONDARY BATTERY INCLUDING THE SAME

(71) Applicant: LG CHEM, LTD., Seoul (KR)

(72) Inventors: Jung Hyun Choi, Daejeon (KR); Yong Ju Lee, Daejeon (KR); Eun Kyung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/771,284

(22) PCT Filed: Jun. 2, 2017

(86) PCT No.: PCT/KR2017/005771
§ 371 (c)(1),
(2) Date: Apr. 26, 2018

(87) PCT Pub. No.: WO2017/209556
PCT Pub. Date: Dec. 7, 2017

(65) Prior Publication Data
US 2018/0323425 A1 Nov. 8, 2018

(30) Foreign Application Priority Data
Jun. 2, 2016 (KR) .................. 10-2016-0068938

(51) Int. Cl.
*H01M 4/36* (2006.01)
*H01M 10/0525* (2010.01)
(Continued)

(52) U.S. Cl.
CPC ........... *H01M 4/366* (2013.01); *H01M 4/131* (2013.01); *H01M 4/134* (2013.01); *H01M 4/364* (2013.01);
(Continued)

(58) Field of Classification Search
None
See application file for complete search history.

(56) References Cited

U.S. PATENT DOCUMENTS 6,770,399 B2   8/2004  Umeno et al.
8,481,212 B2   7/2013  Tanaka et al.
(Continued)

FOREIGN PATENT DOCUMENTS

EP   2 088 221 A1   8/2009
EP   2 372 816 A1   10/2011
(Continued)

OTHER PUBLICATIONS

Extended European Search Report, dated Jan. 15, 2019, for European Application No. 17807049.6.
(Continued)

*Primary Examiner* — Daniel S Gatewood
(74) *Attorney, Agent, or Firm* — Birch, Stewart, Kolasch & Birch, LLP

(57) ABSTRACT

The present invention relates to a negative electrode active material including a secondary particle in which primary particles are aggregated, wherein the primary particle includes: a core including one or more of silicon and a silicon compound; and a surface layer which is disposed on a surface of the core and contains carbon, wherein an average particle size $D_{50}$ of the core is in a range of 0.5 μm to 20 μm, a method of preparing the same, an electrode including the same, and a lithium secondary battery including the same.

13 Claims, 4 Drawing Sheets

(51) Int. Cl.

| | | |
|---|---|---|
| *H01M 4/38* | (2006.01) | |
| *H01M 4/583* | (2010.01) | |
| *H01M 4/62* | (2006.01) | |
| *H01M 4/131* | (2010.01) | |
| *H01M 4/134* | (2010.01) | |
| *H01M 4/587* | (2010.01) | |
| *H01M 4/02* | (2006.01) | |

(52) U.S. Cl.
CPC ........... *H01M 4/386* (2013.01); *H01M 4/583* (2013.01); *H01M 4/587* (2013.01); *H01M 4/625* (2013.01); *H01M 10/0525* (2013.01); *H01M 2004/027* (2013.01)

(56) References Cited

U.S. PATENT DOCUMENTS

| | | |
|---|---|---|
| 8,859,147 B2 | 10/2014 | Tanaka et al. |
| 2002/0086211 A1 | 7/2002 | Umeno et al. |
| 2009/0202911 A1 | 8/2009 | Fukuoka et al. |
| 2011/0159370 A1 | 6/2011 | Inaba et al. |
| 2011/0244333 A1 | 10/2011 | Kawada |
| 2012/0288742 A1 | 11/2012 | Tanaka et al. |
| 2013/0273439 A1 | 10/2013 | Tanaka et al. |
| 2013/0337325 A1* | 12/2013 | Jung ................... H01M 4/483 429/218.1 |
| 2014/0030597 A1* | 1/2014 | Jung ................... C23C 18/54 429/231.1 |
| 2014/0106230 A1 | 4/2014 | Kim et al. |
| 2014/0106231 A1* | 4/2014 | Park ................... H01M 4/485 429/231.8 |
| 2018/0069234 A1 | 3/2018 | Friend et al. |

FOREIGN PATENT DOCUMENTS

| | | | |
|---|---|---|---|
| EP | 2372816 A1 * | 10/2011 | ............ H01M 4/131 |
| EP | 2 618 406 A1 | 7/2013 | |
| EP | 2618406 A1 * | 7/2013 | ............ C01B 33/113 |
| JP | 2002-216751 A | 8/2002 | |
| KR | 10-2005-0090218 A | 9/2005 | |
| KR | 10-2012-0080256 A | 7/2012 | |
| KR | 10-2013-0044627 A | 5/2013 | |
| KR | 10-2013-0087969 A | 8/2013 | |
| KR | 10-2014-0046849 A | 4/2014 | |
| KR | 10-2014-0120751 A | 10/2014 | |
| KR | 10-2015-0128430 A | 11/2015 | |
| KR | 20150128430 A * | 11/2015 | |
| WO | WO 2016/146999 A1 | 9/2016 | |

OTHER PUBLICATIONS

Wu et al., "A Low-cost and Advanced $SiO_x$—C Composite with Hierarchical Structure as an Anode Material for Lithium-ion Batteries," Phys. Chem. Chem. Phys., vol. 17, 2015 (Published Apr. 24, 2015), pp. 13451-13456, XP055500586.

International Search Report issued in PCT/KR2017/005771 (PCT/ISA/210), dated Sep. 8, 2017.

European Search Report for Appl. No. 17807049.6 dated Aug. 31, 2018.

* cited by examiner

NEGATIVE ELECTRODE ACTIVE MATERIAL, METHOD OF PREPARING THE SAME, NEGATIVE ELECTRODE INCLUDING THE SAME AND LITHIUM SECONDARY BATTERY INCLUDING THE SAME

CROSS-REFERENCE TO RELATED APPLICATION

This application claims priority to and the benefit of Korean Patent Application No. 10-2016-0068938, filed on Jun. 2, 2016, the disclosure of which is incorporated herein by reference in its entirety.

TECHNICAL FIELD

The present invention relates to a negative electrode active material, a method of preparing the same, a negative electrode including the same, and a lithium secondary battery including the same.

BACKGROUND ART

With a recent trend of miniaturization and weight lightening of electronic devices, miniaturization and weight lightening of batteries used therein as a power supply have also been required. Lithium secondary batteries are commercialized as batteries that are small, light, chargeable and dischargeable with high capacity, and used in portable electronic devices such as small video cameras, mobile phones and laptops, communication devices, etc.

Generally, a lithium secondary battery is formed with a positive electrode, a negative electrode, a separator and an electrolyte, and charge and discharge are possible due to lithium ions performing a role of transferring energy while travelling back and forth between both electrodes, for example lithium ions coming out of a positive electrode active material and being intercalated into a negative electrode active material, that is, carbon particles, by first charge, and deintercalated again during discharge.

Further, with the development of portable electronic devices, high capacity batteries have been continuously required, and research has been actively conducted on high capacity negative electrode materials such as tin, silicon or the like having significantly higher capacity per unit weight compared to carbon used currently as a negative electrode material. Among them, a negative electrode material using silicon has about 10 times higher capacity than a negative electrode material using carbon.

As a result, research has been conducted on a negative electrode material with high capacity using silicon in which there is no damage to the electrode even when lithium is intercalated and deintercalated repeatedly.

PRIOR ART LITERATURE

Patent Literature (Patent Literature 1) KR2005-0090218A

DISCLOSURE

Technical Problem

The present invention provides a negative electrode active material which can prevent a negative electrode from expanding and contracting due to an electrochemical reaction between lithium ions, which are discharged from a positive electrode during charging and discharging of lithium secondary batteries, and silicon, which are included in a negative electrode.

The present invention provides a negative electrode active material having many paths through which lithium ions can move.

The present invention provides a lithium secondary battery having high capacity and high output characteristics.

The present invention provides a lithium secondary battery which can increase initial efficiency and has improved rate capability.

Technical Solution

According to an embodiment of the present invention, there is provided a negative electrode active material including a secondary particle in which primary particles are aggregated, wherein the primary particle includes: a core including one or more of silicon and a silicon compound; and a surface layer which is disposed on a surface of the core and contains carbon, wherein an average particle size $D_{50}$ of the core is in a range of 0.5 μm to 20 μm.

According to another embodiment of the present invention, there is provided a method of preparing a negative electrode active material, which includes: preparing a core including one or more of silicon or a silicon compound and having an average particle size $D_{50}$ of 0.5 to 20 μm (Step 1); forming a surface layer containing carbon on the surface of the core to form a primary particle (Step 2); and forming a secondary particle by aggregating the primary particles (Step 3).

According to still another embodiment of the present invention, there is provided a negative electrode including the negative electrode active material.

According to still yet another embodiment of the present invention, there is provided a lithium secondary battery including the negative electrode active material.

Advantageous Effects

In a negative electrode active material according to the present invention, due to formation of a secondary particle by primary particles, paths through which lithium ions can move increase such that output characteristics of a lithium secondary battery can be improved, an initial efficiency of the lithium secondary battery is high, and rate capability (charge and discharge characteristics) can be improved.

Further, according to the present invention, due to pores between the primary particles, damage to the electrode can be minimized even when intercalation and deintercalation of lithium ions are repeated and cores contract and expand repeatedly.

MODES OF THE INVENTION

The terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

While the invention has been described with reference to exemplary embodiments illustrated in accompanying drawings, these should be considered in a descriptive sense only, and it will be understood by those skilled in the art that various alterations and equivalent other embodiment may be made. Therefore, the scope of the invention is defined by the appended claims.

The negative electrode active material according to an embodiment of the present invention may include secondary particles in which primary particles are aggregated, and the primary particle includes a core including one or more of silicon and a silicon compound; and a surface layer which is disposed on a surface of the core and contains carbon, wherein an average particle size $D_{50}$ of the core may be in the range of 0.5 μm to 20 μm.

Figure 1:
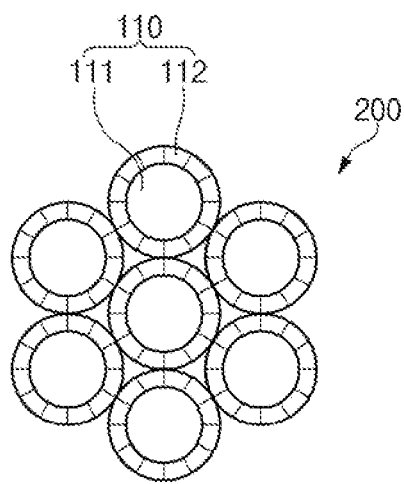
FIG. 1 is a schematic view showing a cross section of a negative electrode active material according to an embodiment of the present invention.

FIG. 1 is a schematic view showing a cross section of a negative electrode active material according to an embodiment of the present invention.

Referring to FIG. 1, the negative electrode active material includes a secondary particle 200 in which primary particles 110 are aggregated.

The primary particle 110 includes a core 111 and a surface layer 112.

The core 111 may include silicon or a silicon compound, and specifically, may be formed of silicon or a silicon compound, and more specifically, may be a silicon compound.

Since the silicon has a theoretical capacity of about 3,600 mAh/g, silicon has a very high capacity compared to the existing negative electrode active material including graphite, and thus the capacity of a lithium secondary battery including the silicon can be improved.

The silicon compound refers to a compound containing silicon, and may be a silicon oxide ($SiO_x$, $0<x<2$) in which silicon is dispersed in a silicon dioxide ($SiO_2$) matrix, a Si—C physically or chemically combined with a carbon-based material, or a silicon alloy (Si-alloy) combined with a metal, and specifically, may be a silicon oxide ($SiO_x$, $0<x<2$), and more specifically may be $SiO_x$ ($0<x\leq1$), for example, SiO.

When the silicon oxide ($SiO_x$, $0<x<2$) is included in the core 111, since the silicon oxide ($SiO_x$, $0<x<2$) has less volume expansion during intercalation and deintercalation of lithium ions due to charging and discharging of a lithium secondary battery as compared with silicon, it is possible to reduce damage to a negative electrode active material and to realize high capacity and high initial efficiency, which are effects of the silicon.

The silicon in the silicon oxide ($SiO_x$, $0<x\leq1$) may be amorphous or crystalline. When the silicon in the silicon oxide ($SiO_x$, $0<x\leq1$) is crystalline, a crystal size may be more than 0 to 30 nm or less.

The cores 111 may each be a porous core including a plurality of pores. The porous core increases the contact area between an electrolyte and an electrode such that lithium ions can be rapidly diffused.

When the core is a porous core, an internal porosity of the core may be 5% to 90% based on the total volume of the core. Here, the porosity refers to a "pore volume per unit mass/specific volume+pore volume per unit mass", and may be measured by a mercury porosimetry or Brunauer-Emmett-Teller (BET) measurement method. When the above-described range is satisfied, the volume expansion of the core 111 during charging and discharging can be suppressed, mechanical strength is excellent, and durability capable of withstanding the manufacturing process of a battery such as roll pressing can be attained.

The average particle size $D_{50}$ of the core 111 may be in the range of 0.5 to 20 μm, and specifically may be in the range of 0.5 to 5 μm. When the average particle size $D_{50}$ of the core is less than 0.5 μm, the secondary particles formed by the core are sintered during the charging and discharging of the secondary battery, and the secondary particles which were sintered and became large may crack, and thereby the performance of the battery may be degraded. Further, pores between the primary particles are significantly reduced, and a change in volume during charging and discharging may be excessively large, leading to deterioration of stability and lifespan characteristics of the battery. When the average particle size $D_{50}$ of the core is more than 20 μm, the exterior of the electrode is not smooth, the active material layer is not smoothly roll-pressed when an electrode is prepared, and the energy density per unit volume is lowered. When the average particle size $D_{50}$ of the core is in the range of 0.5 to 20 μm, aggregation is easy in forming the secondary particle, sintering does not occur even when charging and discharging are repeated, and thus a change in size can be prevented. Further, the high output characteristics of the lithium secondary battery as a final product can be exhibited. In the present specification, the average particle size $D_{50}$ can be defined as a particle size on the basis of 50% of the particle size distribution of particles. The average particle size $D_{50}$ may be measured using, for example, a laser diffraction method. The laser diffraction method generally enables measurement of a particle size of several millimeters to a submicronic levels, such that results with high reproducibility and high resolvability can be obtained. The BET specific surface area of the core 111 may be in the range of 0.5 to 30 $m^2/g$.

The surface layer 112 may contain carbon and may be disposed on the surface of the core 111. The surface layer 112 prevents additional oxidation of the surface of the core 111. The surface layer 112 may form a conductive path in the negative electrode active material to improve the electrical conductivity of the negative electrode active material. The surface layer 112 increases the capacity per unit volume of the primary particle 110, and thereby high capacity can be exhibited.

The carbon may be amorphous carbon or crystalline carbon. When the amorphous carbon is included in the surface layer 112, the strength between the surface layers 112 can be suitably maintained such that expansion of the core 111 can be suppressed. When the crystalline carbon is included in the surface layer 112, conductivity of a negative electrode active material can be further improved. The crystalline carbon may be fluorene, carbon nanotubes, or graphene.

The surface layers 112 may each independently include a carbide of one or two or more selected from the group consisting of tar, pitch and other organic materials, and specifically, the surface layers 112 may each be independently formed of a tar carbide, a pitch carbide, or a carbide of other organic materials. The carbide of other organic materials may be a carbide of an organic material selected from the group consisting of sucrose, glucose, galactose, fructose, lactose, mannose, ribose, aldohexose, ketohexose, and combinations thereof.

The surface layers 112 may each independently include one or two or more pyrolysis products selected from the group consisting of substituted or unsubstituted aliphatic or alicyclic hydrocarbons, substituted or unsubstituted aromatic hydrocarbons, products obtained in the tar distillation process, vinyl-based resins, phenol-based resins, cellulose-based resins, and pitch-based resins. For example, pyrolysis products such as the substituted or unsubstituted aliphatic or alicyclic hydrocarbons, substituted or unsubstituted aromatic hydrocarbons, or the like may be used as a carbon source for chemical vapor deposition.

Specific examples of the substituted or unsubstituted aliphatic or alicyclic hydrocarbons include methane, ethane, ethylene, acetylene, propane, butane, butene, pentane, isobutane, hexane, etc.

Specific examples of the substituted or unsubstituted aromatic hydrocarbons include benzene, toluene, xylene, styrene, ethylbenzene, diphenylmethane, naphthalene, phenol, cresol, nitrobenzene, chlorobenzene, indene, coumarone, pyridine, anthracene, phenanthrene, etc.

Examples of the products obtained in the tar distillation process include gas diesel, creosote oil, anthracene oil, naphtha-cracked tar oil, etc.

The surface layer 112 may include a conductive polymer containing carbon, and the conductive polymer may include one or two or more selected from the group consisting of polycellulose sulfonate, polyacetylene, polyparaphenylene, poly(p-phenylenevinylene), polypyrrole, polythiophene, polyaniline, polyisothianaphthene, polyparamethylene, poly(1-pyrene methyl methacrylate) which is a homopolymer of pyrene, poly(1-pyrene methyl methacrylate-cotriethylene oxide methyl ether methacrylate) which is a copolymer of pyrene, a polymer obtained by changing a pyrene side chain of the pyrene homopolymer or copolymer to an anthracene, a polymer having a carbonyl group and methyl benzoic ester, and a polyacetylene having a conjugation bond.

The surface layer 112 may be included at 2 to 50 parts by weight based on 100 parts by weight of the core 111. The thickness of each of the surface layer 112 may be in the range of 1 to 100 nm, and specifically in the range of 1 to 10 nm. When the above-described range is satisfied, the electrical conductivity of the lithium secondary battery can be improved while the conductive paths of the cores 111 are maintained.

The average particle size $D_{50}$ of the primary particles 110 may be in the range of 0.502 to 20.2 μm, and specifically in the range of 0.502 to 5.2 μm. When the above-described range is satisfied, aggregation is easy in forming the secondary particle, sintering does not occur even when charging and discharging are repeated, and a change in size can be prevented. In addition, high output characteristics can be exhibited.

Further, the secondary particle 200 is formed by aggregation of the primary particles 110, and include pores between the primary particles 110. The porosity between the primary particles 110 is in the range of 2% to 50% based on the total volume of the secondary particle 200. When the above-described range is satisfied, a buffer area can be provided with respect to the volume expansion of the core 111 during charging and discharging, and it is possible to prevent the secondary particle 200 from being crushed. Further, the moving speed of lithium ions is raised to improve output characteristics.

The definition and measurement method of the porosity between the primary particles 110 are mentioned in the description of the internal porosity of the porous particles, and thus the description thereof will be omitted.

The average particle size of the secondary particle 200 may be in the range of 2 to 50 μm, and specifically may be in the range of 2 to 42 μm. When the above-described range is satisfied, paths through which lithium ions can move increase, and thus a lithium secondary battery as a final product can exhibit high capacity, high power, high initial efficiency and excellent rate capability.

Figure 2:
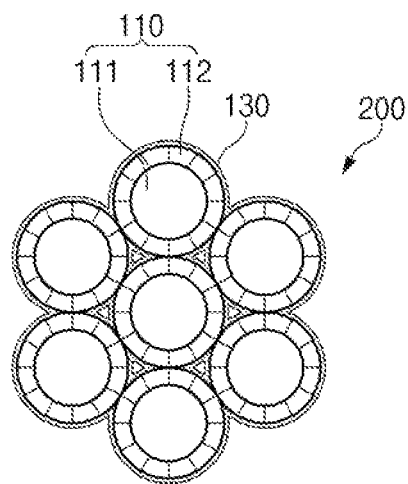
FIG. 2 is a schematic view showing a cross section of a negative electrode active material according to another embodiment of the present invention.

FIG. 2 is a schematic view showing a cross section of a negative electrode active material according to another embodiment of the present invention.

Referring to FIG. 2, the secondary particle 200 of the negative electrode active material may further include a carbon layer 130.

The carbon layer 130 is disposed on the surface of the secondary particle, and specifically is disposed on the surface of the structure in which the primary particles 110 are aggregated to form the secondary particle 200. Due to the carbon layer 130, the expansion of secondary particles can be suppressed during charging and discharging and the conductivity of the negative electrode active material can be further improved.

The carbon layer 130 may contain carbon. Specifically, the carbon layer 130 may be one or more materials which can form the surface layer 112 described above. Further, the carbon layer 130 and the surface layer 112 may be formed of the same material, or may be formed of the different material. More specifically, the surface layer and the carbon layer may all be formed of the above-described carbides of the other organic materials, or the surface layer may be a carbide of other organic materials, and the carbon layer may be a pitch carbide.

The thickness of the carbon layer 130 may be in the range of 5 to 100 nm, and specifically, may be in the range of 10 to 100 nm. When the above-described range is satisfied, the electrical conductivity of the lithium secondary battery can be improved while the conductive path between the secondary particles is maintained.

The content of the carbon layer may be in the range of 0.1 to 50 wt %, and specifically, in the range of 5 to 25 wt % based on the total weight of the secondary particle. When the above-described range is satisfied, a conductive path for the movement of lithium ions can be secured. When the carbon layer is formed at a level higher than the above-described range, the initial efficiency may be significantly decreased.

Figure 3:
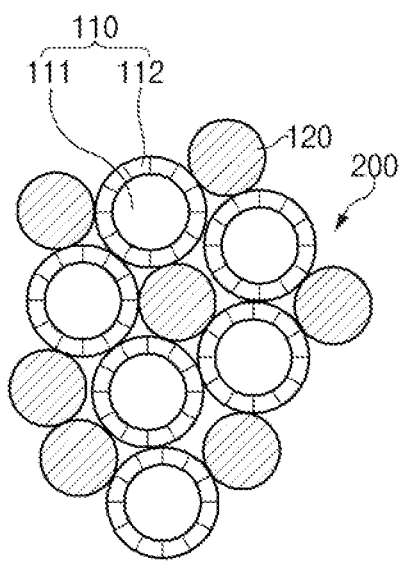
FIG. 3 is a schematic view showing a cross section of a negative electrode active material according to still another embodiment of the present invention.

FIG. 3 is a schematic view showing a cross section of a negative electrode active material according to still another embodiment of the present invention.

Referring to FIG. 3, the negative electrode active material may include a secondary particle 200 in which primary particles 110 and crystalline carbon-based materials 120 are aggregated.

The primary particles 110 include the core 111 and the surface layer 112, and the description of the primary particle, the core 111, the surface layer 112, and the secondary particles 200 is as described above.

The crystalline carbon-based material 120 can improve the capacity and cycle characteristics of a lithium secondary battery.

Specific examples of the crystalline carbon-based material 120 include graphene, carbon nanotubes, nanofibers, etc.

The content of the crystalline carbon-based materials 120 may be in the range of 75 to 95 parts by weight based on 100 parts by weight of the primary particles 110. When the above-described range is satisfied, the capacity and cycle characteristics of the lithium secondary battery as a final product can be further improved.

The crystalline carbon-based materials may be mixed with the primary particles in a solvent, and a mixture is dried and calcined to form a secondary particle structure.

According to yet another example of the present invention, the negative electrode active material may further include graphite-based active material particles. The graphite-based active material particles are used together with the secondary particles to improve charge and discharge characteristics. The graphite-based active material particle may be one or more selected from the group consisting of artificial graphite, natural graphite, graphitized carbon fibers, and graphitized mesocarbon microbeads.

The weight ratio of the secondary particles and the graphite-based active material particles in the negative electrode active material may be in the range of 1:1 to 1:49, and specifically, may be in the range of 1:9 to 1:19. When the above-described range is satisfied, the charge and discharge characteristics of the battery are further improved and the pores between the secondary particles can be ensured, such that damage to the electrode can be minimized even when the contraction and expansion of the secondary particles are repeated.

The graphite-based active material particles may be mixed together with the prepared secondary particles in a solvent and used for the production of the negative electrode.

Hereinafter, a method of preparing a negative electrode active material according to an embodiment of the present invention will be described.

A method of preparing a negative electrode active material according to an embodiment of the present invention includes preparing a core including one or more of silicon or a silicon compound and having an average particle size $D_{50}$ of 0.5 to 20 μm (Step 1); forming a surface layer containing carbon on the surface of the core to form a primary particle (Step 2); and forming a secondary particle by aggregating the primary particles (Step 3).

In Step 1, the core may be prepared by pulverizing silicon or a silicon compound having a high average particle size $D_{50}$ to have an average particle size $D_{50}$ of 0.5 to 20 μm. Specifically, the core may be prepared by introducing a silicon oxide having an average particle size $D_{50}$ of 5 to 50 μm into a bead mill with a zirconia ball and pulverizing in the presence of an ethanol solvent. However, the present invention is not limited thereto, and the core may be formed of silicon or a silicon compound obtained by performing heat treatment on a silicon oxide in a temperature range of 1,100° C. or less in an inert gas or reducing atmosphere. Here, the silicon oxide is a general term of an amorphous silicon oxide obtained by cooling and precipitating silicon monoxide gas produced by heating a mixture of silicon dioxide and metal silicon. Further, specific examples of the inert gas include Ar, He, $H_2$, and $N_2$, and they may be used alone or as a mixed gas. The temperature of the precipitation plate for cooling and precipitating the silicon monoxide gas may be in the range of 500 to 1,050° C.

Further, the core may be silicon obtained by heating and evaporating metallic silicon in a vacuum and precipitating it on a cooling plate.

When the carbon is carbon included in the carbides of the other organic materials described above, Step 2 may include Step 2-1 of pulverizing a mixture of the core and the other organic materials in a solvent by a milling process and drying, and Step 2-2 of spheroidizing the mixture and performing heat treatment thereon to carbonize the organic material to form a surface layer containing carbon on the surface of the core to form a primary particle.

The solvent is not particularly limited as long as the other organic materials can be dispersed uniformly, and may be an alcohol such as ethanol, n-butanol, 1-propanol, or 2-propanol. The content of the organic solvent may be in the range of 100 to 300 parts by weight based on 100 parts by weight of the particles.

The milling process is performed such that the core and the organic materials are pulverized to a desired size, the particles and the organic materials are well mixed in the solvent, and the organic materials are thereby uniformly distributed on the surface of the particle. The milling process may be carried out using a beads mill, a high energy ball mill, a planetary mill, a stirred ball mill, a vibration mill, etc. Here, the bead mill or the ball mill may be formed of a chemically inert material which does not react with silicon and organic materials, and as a specific example, may be formed of a zirconia material.

The drying may be performed in a temperature range in which the solvent can be evaporated or volatilized, and the temperature range may be 60 to 150° C.

Instead of the other organic materials described above, the carbon may be derived from any of the sources of the surface layer described above.

When the carbon is carbon included in the pyrolysis product, Step 2 may be a step of forming a surface layer containing carbon on the surface of the core by chemical vapor deposition.

When the chemical vapor deposition method is used, the surface layer can be uniformly formed on the surface of the core.

When the chemical vapor deposition is performed, the temperature may be in the range of 700 to 1,200° C., and a material capable of generating carbon by pyrolysis at the above-described temperature is selected as the carbon source. The carbon source may be one or two or more selected from the group consisting of substituted or unsubstituted aliphatic or alicyclic hydrocarbons, and substituted or unsubstituted aromatic hydrocarbons.

When the carbon is carbon included in a conductive polymer, the core may be dip-coated in a solution containing the conductive polymer to form a surface layer on the core. The description of the conductive polymer is as described above.

Further, the core may be coarse ground in an inert atmosphere to obtain a desired average particle size. Moreover, the mixture of the core and the other organic materials may further include a crystalline carbon-based material.

In Step 3, the primary particles may be aggregated to form a secondary particle. Specifically, when a solution containing the primary particles and the solvent is prepared and the solution is spray-dried, a secondary particle in which the primary particles aggregate may be formed. The solution may further include a carbon precursor to facilitate aggregation of the primary particles.

The solvent is not particularly limited as long as it allows the primary particles to be well dispersed, and specific examples thereof include water, alcohols, N-methyl-2-pyrrolidone (NMP), dimethylsulfoxide (DMSO), acetonitrile, acetone, tetrahydrofuran (THF), diethyl ether, toluene, 1,2-dichlorobenzene, etc.

The inlet temperature during the spray drying may be in the range of 100 to 250° C.

The secondary particle may be further subjected to a separate calcination process for improving durability and conductivity. The calcination temperature may be in the range of 400 to 1,000° C.

In a method of preparing a negative electrode active material according to yet another embodiment of the present invention, the other steps are the same, but in Step 3, the secondary particles may be formed by aggregation such that the porosity between the primary particles is in the range of 2% to 50%. Specifically, in Step 3, a filler is included in the solvent together with the primary particles to prepare a solution, and the solution is spray-dried to form preliminary secondary particles in which the primary particles and the filler are aggregated.

The filler is included to form secondary particles such that the porosity between the primary particles is in the range of 2% to 50%, and the porosity may be controlled by adjusting the amount of the filler. The filler may be included in a volume ratio of 1:0.01 to 1:0.43 with respect to the primary particle. Specific examples of the filler include a metal, polymethyl methacrylate (PMMA), polystyrene beads, sodium chloride (NaCl), potassium chloride (KCl), sodium sulfate ($Na_2SO_4$), etc.

When the above-described calcination process is included in Step 3, the filler may be sodium chloride, calcium chloride, or sodium sulfate. When the calcination process is performed at 900 to 1,000° C., the filler may be polymethyl methacrylate (PMMA), sodium chloride, calcium chloride, or sodium sulfate.

The preliminary secondary particle may be further subjected to ultrasonic treatment and/or a drying process after water or a mixture of water and ethanol is added to remove the filler. Accordingly, the secondary particle having a porosity in the range of 2% to 50% may be prepared.

A lithium secondary battery according to yet another embodiment of the present invention will be described.

The lithium secondary battery according to yet another embodiment of the present invention includes an electrode assembly including a positive electrode, a negative electrode and a separator interposed between the positive electrode and the negative electrode, and an electrolyte.

The positive electrode may include a positive electrode current collector, and a mixture of a positive electrode active material, a conductive material and a binder on the positive electrode current collector.

The positive electrode current collector is required to have high conductivity, allow the mixture to be easily adhered, and be non-reactive at a voltage range of a battery. Specific examples of the positive electrode current collector include aluminum, nickel, alloys thereof, etc. The thickness of the positive electrode current collector may be in the range of 3 to 500 μm.

Specific examples of the positive electrode active material include lithium cobalt oxides such as $Li_{x1}CoO_2$ (0.5<x1<1.3); lithium nickel oxide such as $Li_{x2}NiO_2$ (0.5<x2<1.3); lithium manganese oxides such as $Li_{1+x3}Mn_{2-x3}O_4$ (0≤x3≤0.33), $LiMnO_3$, $LiMn_2O_3$, or $Li_{x4}MnO_2$ (0.5<x4<1.3); lithium copper oxides such as $Li_2CuO_2$; lithium iron oxides such as $LiFe_3O_4$; lithium nickel cobalt manganese oxides such as $Li[Ni_{a1}CO_{b1}Mn_{c1}]O_2$ (a1+b1+c1=1, 0<a1<1, 0<b1<1, 0<c1<1); lithium nickel cobalt aluminum oxides such as $Li[Ni_{a2}Co_{b2}Al_{c2}]O_2$ (a2+b2+c2=1, 0<a2<1, 0<b2<1, 0<c2<1); lithium vanadium compounds such as $LiV_3O_8$; nickel-site type lithium nickel oxides such as $LiNi_{1-a3}M_{a3}O_2$ (M=Co, Mn, Al, Cu, Fe, Mg, B or Ga, 0.01≤a3≤0.3); lithium manganese composite oxides such as $LiMn_{2-a4}M_{a4}O_2$ (M=Co, Ni, Fe, Cr, Zn or Ta, 0.01≤a4≤0.1) or $Li_2Mn_3MO_8$ (M=Fe, Co, Ni, Cu or Zn); $LiMn_2O_4$ in which a part of lithium is substituted with an alkaline earth metal ions; disulfide compounds; vanadium oxides such as $V_2O_5$ or $Cu_2V_2O_7$; $Fe_2(MoO_4)_3$, etc. More specifically, the positive electrode active material may be a lithium nickel cobalt manganese oxide such as $Li[Ni_{a1}CO_{b1}Mn_{c1}]O_2$ (a1+b1+c1=1, 0.3≤a1≤0.4, 0.3≤b1≤0.4, 0.3≤c1≤0.4) or a lithium nickel cobalt aluminum oxide such as $Li[Ni_{a2}Co_{b2}Al_{c2}]O_2$ (a2+b2+c2=1, 0.3≤a2≤0.4, 0.3≤b2≤0.4, 0.3≤c2≤0.4). One or more thereof may be included in the positive electrode active material.

The conductive material is a material having electrical conductivity without causing a chemical change in the lithium secondary battery of the present invention. Specific examples of the conductive material include conductive materials such as graphite such as natural graphite or artificial graphite; carbon black such as carbon black, acetylene black, ketjen black, channel black, furnace black, lamp black, thermal black, and the like; conductive fibers such as carbon fibers and metal fibers; metal powders such as carbon fluoride, aluminum, and nickel powder; conductive whiskers such as zinc oxide, potassium titanate and the like; conductive metal oxides such as titanium oxide; polyphenylene derivatives, etc.

The binder is a component which assists in bonding between the positive electrode active material and the conductive material and in bonding to the current collector. Specific examples of the binder include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM) rubber, a hydrogenated nitrile butadiene rubber (HNBR), a sulfonated ethylene propylene diene, a styrene butadiene rubber (SBR), a fluorine rubber, various copolymers, etc.

The negative electrode includes a negative electrode current collector and a negative electrode active material positioned on the negative electrode current collector.

The negative electrode current collector is required to have high conductivity, allow the negative electrode active material to be easily adhered, and be non-reactive at a voltage range of a battery. Specific examples of the negative electrode current collector include copper, gold, nickel, or alloys thereof.

The description of the negative active material was mentioned in the description of FIG. 1, and thus will be omitted.

The separator prevents a short circuit between the positive electrode and the negative electrode, and provides a path for lithium ions. An insulating thin film having high ion permeability and mechanical strength may be used as the separator.

Specific examples of the separator include a polyolefin-based polymer membrane such as polypropylene and polyethylene, or a multiple membrane thereof, a microporous film, a woven fabric, a nonwoven fabric, etc. When a solid electrolyte such as a polymer is used as an electrolyte to be described later, the solid electrolyte may also serve as a separator.

The electrolyte may be an electrolyte containing a lithium salt. Specific examples of the anion of the lithium salt include F$^-$, Cl$^-$, Br$^-$, I$^-$, NO$_3^-$, N(CN)$_2^-$, BF$_4^-$, ClO$_4^-$, PF$_6^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, CF$_3$SO$_3^-$, CF$_3$CF$_2$SO$_3^-$, (CF$_3$SO$_2$)$_2$N$^-$, (FSO$_2$)$_2$N$^-$, CF$_3$CF$_2$(CF$_3$)$_2$CO$^-$, (CF$_3$SO$_2$)$_2$CH$^-$, (SF$_5$)$_3$C$^-$, (CF$_3$SO$_2$)$_3$C$^-$, CF$_3$(CF$_2$)$_7$SO$_3^-$, CF$_3$CO$_2^-$, SCN$^-$, (CF$_3$CF$_2$SO$_2$)$_2$N$^-$, etc. One or two or more thereof may be included in the electrolyte.

The outer shape of the lithium secondary battery according to yet another embodiment of the present invention is not particularly limited, and specific examples thereof include a cylindrical battery using a can, square, pouch, or coin type batteries, etc.

The lithium secondary battery according to yet another embodiment of the present invention may be used in a battery cell used as a power source for a small device, and may be preferably used as a unit battery in a middle or large sized battery module including a plurality of battery cells. Specific examples of the middle or large sized battery module include an electric vehicle, a hybrid electric vehicle, a plug-in hybrid electric vehicle, a system for electric power storage, or the like, but are not limited thereto.

Hereinafter, the present invention will be described in more detail with reference to the following examples. These examples are provided only for illustration of the present invention and should not be construed as limiting the scope and spirit of the present invention. Various modifications and alterations of the invention fall within the scope of the invention and the scope of the invention is defined by the accompanying claims.

Example 1: Preparation of Negative Electrode Active Material

<Preparation of Core>

Silica oxides (SiO$_x$, 0<x≤1) having an average particle size D$_{50}$ of 10 μm were placed in a Spex mill 8000M, and 15 pieces of a sus ball media were added thereto, and milled for 2 hours to pulverize the particles to an average particle size D$_{50}$ of 1 μm to prepare a core.

<Preparation of Primary Particle>

10 g of the core and 0.5 g of sucrose were added to 30 g of isopropanol to prepare a solution. The mixture was pulverized for 12 hours at a bead rotation rate of 1,200 rpm using beads formed of zirconia (average particle size: 0.3 mm). Subsequently, the mixture was dried in an oven at 120° C. for 2 hours. The dried mixture was pulverized again in a mortar and classified to form silicon particles mixed with sucrose. The heat treatment was performed at 800° C. under a nitrogen atmosphere to carbonize the sucrose to form a surface layer having a thickness of 2 nm to prepare primary particles. The content of the surface layer was 2.1 wt % based on the total weight of the core.

<Preparation of Negative Electrode Active Material>

The solution containing the primary particles and ethanol/water (volume ratio=1:9) in a volume ratio of 1:10 was stirred with a mechanical homogenizer at 10,000 rpm for 30 minutes to prepare a dispersion solution for spray drying. The dispersion solution was spray-dried under the conditions of an inlet temperature of 180° C., an aspirator of 95%, and a feeding rate of 12 of a mini spray-dryer (manufactured by Buchi Co., Ltd., model: B-290 Mini Spray-Dryer) to prepare preliminary secondary particles, which were then transferred to an alumina boat. The temperature of a tube furnace equipped with a quartz tube having a length of 80 cm and an inner diameter of 4.8 cm was raised to 600° C. at a rate of 10° C./min, and then calcined while maintaining temperature for 2 hours to prepare secondary particles. The prepared secondary particles had a porosity of 1% and an average particle size D$_{50}$ of 5 μm. The porosity was measured by a mercury porosimeter method.

Example 2: Preparation of Negative Electrode Active Material

<Preparation of Core and Primary Particle>

The core and the primary particles were prepared in the same manner as in Example 1.

<Preparation of Negative Electrode Active Material>

The solution containing the primary particles, NaCl and ethanol/water (volume ratio=1:9) in a volume ratio of 1:0.4:10 was stirred with a mechanical homogenizer at 10,000 rpm for 30 minutes to prepare a dispersion solution for spray drying. The dispersion solution was spray-dried under the conditions of an inlet temperature of 180° C., an aspirator of 95%, and a feeding rate of 12 of a mini spray-dryer (manufactured by Buchi Co., Ltd., model: B-290 Mini Spray-Dryer) to prepare preliminary secondary particles, which were then transferred to an alumina boat. The temperature of a tube furnace equipped with a quartz tube having a length of 80 cm and an inner diameter of 4.8 cm was raised to 600° C. at a rate of 10° C./min, and then calcined while maintaining the temperature for 2 hours to carbonize preliminary secondary particles.

In order to remove NaCl, which is a filler present in the preliminary secondary particles, the preliminary secondary particles were added to 1 liter of ethanol/water (volume ratio=1:9), and then a mixture was subjected to ultrasonic treatment for 1 hour using a bath type sonicator and filtered. Subsequently, the preliminary secondary particles in which residual NaCl was sufficiently removed by using 2 liters of ethanol/water (volume ratio=1:9) were dried in an oven at 120° C. for 12 hours to prepare secondary particles, that is, a negative electrode active material. The prepared secondary particles had a porosity of 25% and an average particle size D$_{50}$ of 7 μm. The porosity was measured by a mercury porosimeter method.

Example 3: Preparation of Negative Electrode Active Material

<Preparation of Negative Electrode Active Material>

10 g of the secondary particles prepared in Example 1 was subjected to pitch coating with a coal tar pitch. The pitch-coated spherical particles were heat-treated at 980° C. in a nitrogen atmosphere to prepare secondary particles including a carbon layer having a thickness of 20 nm. The content of the carbon layer was 9 wt % based on the total weight of the secondary particles including the carbon layer. The prepared final secondary particles had a porosity of 0.5% and an average particle size D$_{50}$ of 5.5 μm. The porosity was measured by a mercury porosimeter method.

Comparative Example 1: Preparation of Negative Electrode Active Material

<Preparation of Core>

Silicon oxides (SiO$_x$, 0<x≤1) having an average particle size D$_{50}$ of 5 μm were added to a bead mill together with zirconia balls and ethanol, milled for 8 hours and pulverized to particles having an average particle size D$_{50}$ of 300 nm to prepare a core.

<Preparation of Primary Particle>

7 g of the core and 3 g of sucrose were added to 50 g of isopropanol to prepare a solution. The mixture was pulverized for 12 hours at a bead rotation rate of 1,200 rpm using beads formed of zirconia (average particle size: 0.3 mm). Subsequently, the mixture was dried in an oven at 120° C. for 2 hours. The dried mixture was pulverized again in a mortar and classified to form silicon particles mixed with sucrose. The heat treatment was performed at 800° C. under a nitrogen atmosphere to carbonize the sucrose to form a surface layer having a thickness of 6 nm to prepare primary particles. The weight of the surface layer was 15.3 wt % based on the total weight of the core.

<Preparation of Negative Electrode Active Material>

The solution containing the primary particles and ethanol/water (volume ratio=1:9) in a volume ratio of 1:10 was stirred with a mechanical homogenizer at 10,000 rpm for 30 minutes to prepare a dispersion solution for spray drying. The dispersion solution was spray-dried under the conditions of an inlet temperature of 180° C., an aspirator of 95%, and a feeding rate of 12 of a mini spray-dryer (manufactured by Buchi Co., Ltd., model: B-290 Mini Spray-Dryer) to prepare preliminary secondary particles, which were then transferred to an alumina boat. The temperature of a tube furnace equipped with a quartz tube having a length of 80 cm and an inner diameter of 4.8 cm was raised to 600° C. at a rate of 10° C./min, and then calcined while maintaining the temperature for 2 hours to prepare secondary particles having an average particle size $D_{50}$ of 0.9 μm.

Comparative Example 2: Preparation of Negative Electrode Active Material

<Preparation of Core>

Silica oxides ($SiO_x$, $0<x\leq1$) having an average particle size $D_{50}$ of 50 μm were placed in a Spex mill 8000M, and 15 pieces of a sus ball media were added thereto, and milled for 30 minutes to pulverize the particles to an average particle size $D_{50}$ of 25 μm to prepare a core.

<Preparation of Primary Particle>

10 g of the core and 5 g of sucrose were added to 30 g of isopropanol to prepare a solution. The mixture was pulverized for 12 hours at a bead rotation rate of 1,200 rpm using beads formed of zirconia (average particle size: 0.3 mm). Subsequently, the mixture was dried in an oven at 120° C. for 2 hours. The dried mixture was pulverized again in a mortar and classified to form silicon particles mixed with sucrose. The heat treatment was performed at 800° C. under a nitrogen atmosphere to carbonize the sucrose to form a surface layer having a thickness of 2 nm to prepare primary particles. The weight of the surface layer was 17.4 wt % based on the total weight of the core.

<Preparation of Negative Electrode Active Material>

The solution containing the primary particles and ethanol/water (volume ratio=1:9) in a volume ratio of 1:10 was stirred with a mechanical homogenizer at 10,000 rpm for 30 minutes to prepare a dispersion solution for spray drying. The dispersion solution was spray-dried under the conditions of an inlet temperature of 180° C., an aspirator of 95%, and a feeding rate of 12 of a mini spray-dryer (manufactured by Buchi Co., Ltd., model: B-290 Mini Spray-Dryer) to prepare preliminary secondary particles, which were then transferred to an alumina boat. The temperature of a tube furnace equipped with a quartz tube having a length of 80 cm and an inner diameter of 4.8 cm was raised to 600° C. at a rate of 10° C./min, and then calcined while maintaining the temperature for 2 hours to prepare secondary particles having an average particle size $D_{50}$ of 40 μm.

Comparative Example 3: Preparation of Negative Electrode Active Material

The primary particles of Example 1 were subjected to pitch coating with 10 wt % of a coal tar pitch. The pitch-coated spherical particles were heat-treated at 980° C. in a nitrogen atmosphere to prepare a negative electrode active material having an average particle size $D_{50}$ of 1.2 μm.

Examples 4 to 6 and Comparative Examples 4 to 6: Preparation of Battery

<Preparation of Negative Electrode>

Each of the negative electrode active materials prepared in Examples 1 to 3 and Comparative Examples 1 to 3, fine graphite as a conductive material, and polyacrylonitrile as a binder were mixed at a weight ratio of 7:2:1 to prepare 0.2 g of a mixture. 3.1 g of N-methyl-2-pyrrolidone (NMP) as a solvent was added to the mixture to prepare a negative electrode mixture slurry. The negative electrode mixture slurry was applied onto a copper (Cu) metal thin film as a negative electrode current collector having a thickness of 20 μm and dried. Here, the temperature of the circulating air was 80° C. Subsequently, the resultant was roll-pressed, dried in a vacuum oven at 130° C. for 12 hours, and then punched to a circular shape of 1.4875 $cm^2$ to prepare a negative electrode.

<Preparation of Battery>

Each of the negative electrodes thus prepared was cut into a circular shape of 1.4875 $cm^2$, which was used as a negative electrode, and a lithium metal thin film cut into a circle of 1.4875 $cm^2$ was used as a positive electrode. A porous polyethylene separator was interposed between the positive electrode and the negative electrode, 0.5 wt % of vinylene carbonate was dissolved in a mixed solution in which ethyl methyl carbonate (EMC) and ethylene carbonate (EC) were mixed in a mixing volume ratio of 7:3, and then an electrolyte in which 1M $LiPF_6$ was dissolved was injected thereto to prepare a lithium coin half-cell.

Experimental Example 1: Evaluation of Discharge Capacity, Initial Efficiency, Capacity Retention Ratio and Electrode Thickness Change Ratio The batteries of Examples 4 to 6 and Comparative Examples 4 to 6 were charged and discharged to evaluate a capacity retention ratio and an electrode thickness change ratio, and the results are listed in the following Table 1.

Further, during the first and second cycles, charging and discharging was performed at 0.1 C, and during the 3rd through 49th cycles, charging and discharging was performed at 0.5 C. At the 50th cycle, charging and discharging was terminated in a charging state (lithium ions were put in the negative electrode), and after disassembling the battery, a thickness was measured and an electrode thickness change ratio was calculated.

Charging conditions: CC (constant current)/CV (constant voltage)(5 mV/0.005 C current cut-off)

Discharging conditions: CC (constant current) condition 1.5V

The discharge capacity (mAh/g) and initial efficiency (%) were derived from the result after charging and discharging once. Specifically, the initial efficiency (%) was derived by the following calculation.

Initial efficiency (%)=(discharge capacity after one discharge/one charge capacity)×100

Each of the capacity retention ratio and the electrode thickness change ratio was derived by the following calculation.

Capacity retention ratio (%)=(49 times discharge capacity/one discharge capacity)×100

Electrode thickness change ratio (%)=(final electrode thickness change amount/initial electrode thickness)×100

TABLE 1

|  | Active material | Discharge capacity (mAh/g) | Initial efficiency (%) | Capacity retention ratio (%) | Electrode thickness change ratio (%) |
|---|---|---|---|---|---|
| Example 4 | Example 1 | 1550 | 74.5 | 86.8 | 120 |
| Example 5 | Example 2 | 1560 | 75.5 | 87.9 | 101 |
| Example 6 | Example 3 | 1570 | 75.7 | 89.0 | 105 |
| Comparative Example 4 | Comparative Example 1 | 1530 | 70.2 | 81 | 230 |
| Comparative Example 5 | Comparative Example 2 | 1550 | 73.2 | 0.5 | 145 |
| Comparative Example 6 | Comparative Example 3 | 1540 | 72.8 | 80 | 140 |

According to the table, it can be confirmed that Examples 4 to 6 have the discharge capacities generally larger than those of Comparative Examples 4 to 6, and have high initial efficiency and capacity retention ratio and a remarkably low electrode thickness change ratio. Accordingly, it can be seen that, in the case where the active material of the present invention is used, a better effect can be obtained compared to the case where the active material of the present invention is not used. Particularly, in the case of Comparative Example 5 in which secondary particles including a core having an average particle size larger than those of the examples were used, the conductive path was easily blocked due to the large size of the core, such that charging and discharging were not uniformly performed, and a capacity retention ratio was significantly low. Moreover, it can be confirmed that Example 2 in which a porosity was 25% had a smaller electrode thickness change ratio compared to Examples 1 and 3. Further, it can be confirmed that, in the case of Example 3 in which the carbon layer was formed, it was confirmed that the discharge capacity, initial efficiency, and capacity retention ratio were improved compared to Examples 1 and 2.

Examples 7 to 9 and Comparative Examples 7 to 9: Preparation of Battery

<Preparation of Negative Electrode>

A mixed negative electrode active material prepared by mixing each of the negative electrode active materials prepared in Examples 1 to 3 and Comparative Examples 1 to 3 with graphite (natural graphite) at a weight ratio of 1:9, carbon black as a conductive material, and carboxylmethyl cellulose (CMC) and a styrene butadiene rubber (SBR) as binders were mixed at a weight ratio of 95.8:1:1.7:1.5 to prepare 5 g of a mixture. 28.9 g of distilled water was added to the mixture to prepare a negative electrode mixture slurry. The negative electrode mixture slurry was applied onto a copper (Cu) metal thin film as a negative electrode current collector having a thickness of 20 μm and dried. Here, the temperature of the circulating air was 60° C. Subsequently, the resultant was roll-pressed, dried in a vacuum oven at 130° C. for 12 hours, and then punched to a circular shape of 1.4875 cm² to prepare a negative electrode.

<Preparation of Battery>

Each of the negative electrodes thus prepared was cut into a circular shape of 1.4875 cm², which was used as a negative electrode, and a lithium metal thin film cut into a circle of 1.4875 cm² was used as a positive electrode. A porous polyethylene separator was interposed between the positive electrode and the negative electrode, 0.5 wt % of vinylene carbonate was dissolved in a mixed solution in which ethyl methyl carbonate (EMC) and ethylene carbonate (EC) were mixed in a mixing ratio of 7:3, and then an electrolyte in which 1M $LiPF_6$ was dissolved was injected thereto to prepare a lithium coin half-cell.

Figure 4:
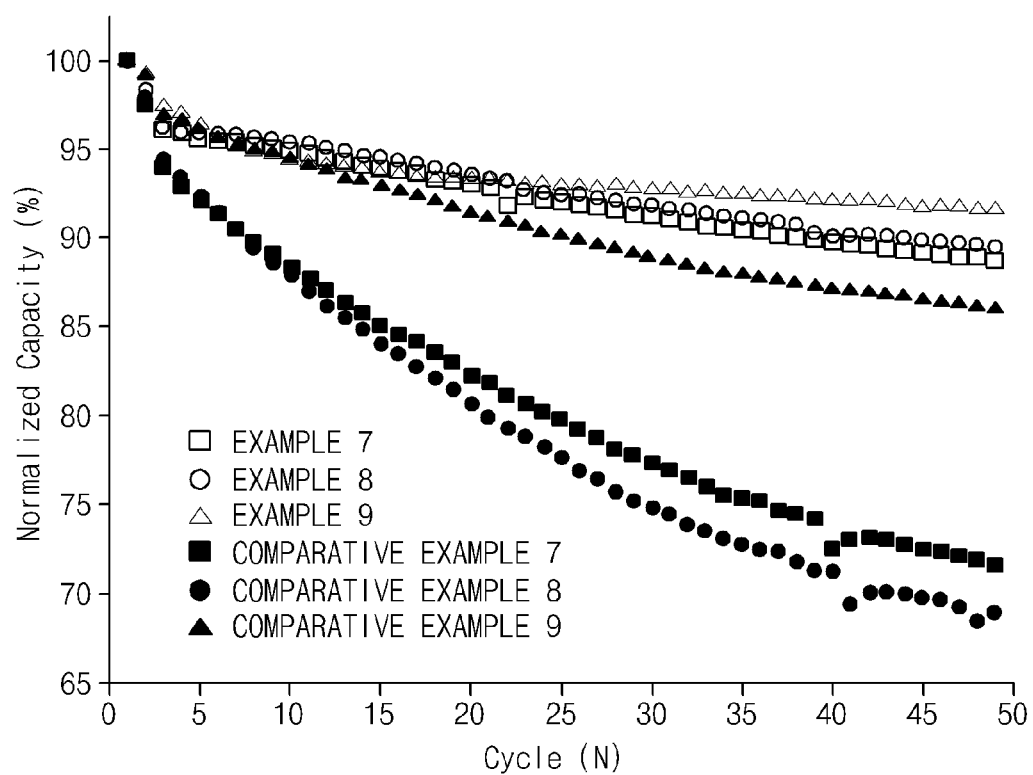
FIG. 4 is a graph showing normalized capacity of examples of the present invention and comparative examples.

Experimental Example 2: Evaluation of Capacity Retention Ratio and Electrode Thickness Change Ratio The batteries of Examples 7 to 9 and Comparative Examples 7 to 9 were charged and discharged to evaluate a capacity retention ratio and an electrode thickness change ratio, and the results are listed in the following Table 2. FIG. 4 shows the normalized capacity for each cycle number.

Further, during the first and second cycles, charging and discharging was performed at 0.1 C, and during 3rd through 49th cycles, charging and discharging was performed at 0.5 C. At 50th cycle, charging and discharging was terminated in a charging state (lithium ions were put in the negative electrode), and after disassembling the battery, a thickness was measured and an electrode thickness change ratio was calculated.

Charging conditions: CC (constant current)/CV (constant voltage)(5 mV/0.005 C current cut-off)

Discharging conditions: CC (constant current) condition 1.5V

Each of the capacity retention ratio and the electrode thickness change ratio was derived by the following calculation.

Capacity retention ratio (%)=(49 times discharge capacity/one discharge capacity)×100

Electrode thickness change ratio (%)=(electrode thickness change amount/initial electrode thickness)×100

TABLE 2

|  | Active material |  | Capacity retention ratio (%) | Electrode thickness change ratio (%) |
|---|---|---|---|---|
| Example 7 | Example 1 | Graphite | 88.8 | 53.4 |
| Example 8 | Example 2 | Graphite | 89.5 | 50.2 |
| Example 9 | Example 3 | Graphite | 91.6 | 52.1 |
| Comparative Example 7 | Comparative Example 1 | Graphite | 71.6 | 102.5 |
| Comparative Example 8 | Comparative Example 2 | Graphite | 68.9 | 99.6 |
| Comparative Example 9 | Comparative Example 3 | Graphite | 86.0 | 60.5 |

Referring to Table 2 and FIG. 4, it was confirmed that the batteries of Examples 7 to 9 according to the present invention were superior in capacity retention ratio, and had less change in electrode thickness compared to the batteries of Comparative Examples 7 to 9. Further, in the case of Examples 7 to 9, it was confirmed that the performance had superior capacity retention ratio and lower electrode thickness change ratio compared to Examples 4 to 6. Accordingly, it can be seen that, when the active material of the present invention is used together with graphite, more excellent effects can be obtained.

Experimental Example 3: Evaluation of Rate Capability

The charging and discharging characteristics of the batteries of Examples 7 to 9 and Comparative Examples 7 to 9 were evaluated. The rate capability was measured to determine how much the discharge capacity was reduced while the charge rate was fixed at 0.2 C and the discharge rates were changed to 0.2 C, 1.0 C, 3.0 C and 5.0 C. The results are listed in Table 3. Further, the discharge capacity during discharging at 0.2 C was set to 100%. The results are shown in Table 3 and FIG. 5.

TABLE 3

|  | 0.2 C | 1.0 C | 3.0 C | 5.0 C |
|---|---|---|---|---|
| Example 7 | 100 | 99 | 95 | 87 |
| Example 8 | 100 | 99 | 96 | 88 |
| Example 9 | 100 | 99 | 96 | 89 |
| Comparative Example 7 | 100 | 97 | 92 | 83 |
| Comparative Example 8 | 100 | 95 | 90 | 80 |
| Comparative Example 9 | 100 | 97 | 93 | 84 |

Figure 5:
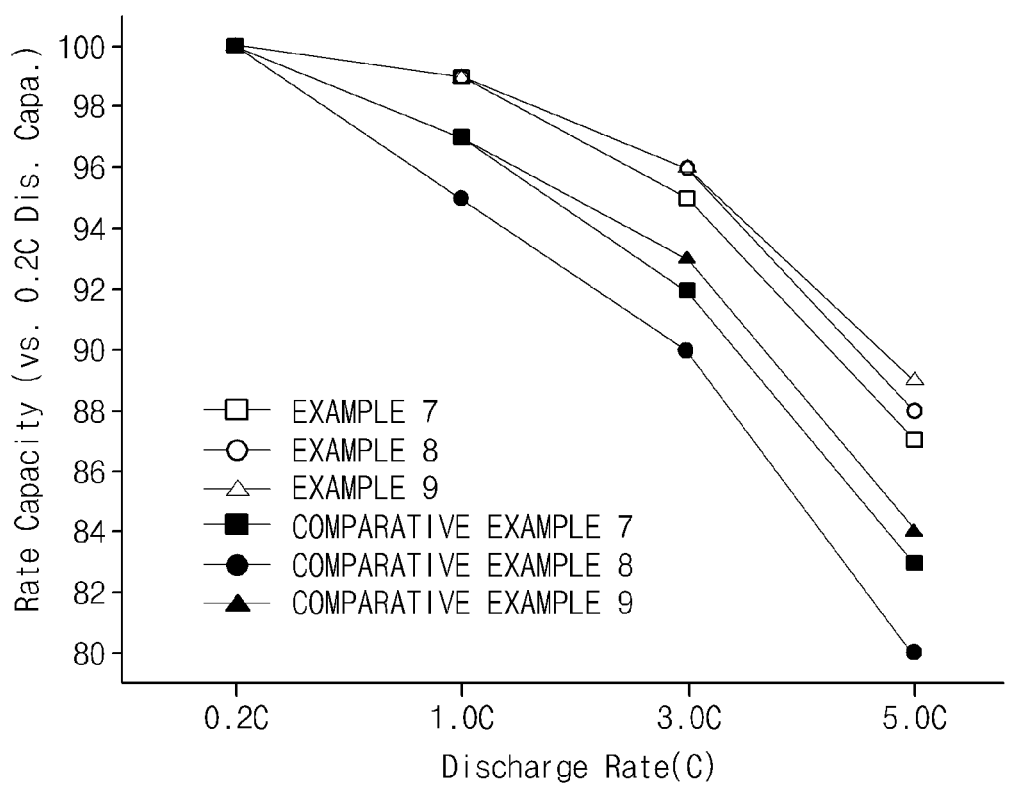
FIG. 5 is a graph showing rate capability of examples of the present invention and comparative examples.

Referring to Table 3 and FIG. 5, it can be confirmed that the batteries of Examples 7 to 9 according to the present invention have superior discharge characteristics compared to lithium secondary batteries of Comparative Examples 7 to 9.

It could be seen from the results of the experimental examples that the batteries including the active materials of Examples 1 to 3 according to the present invention exhibited excellent results in all items in general.

DESCRIPTION OF REFERENCE NUMERALS

| 110: primary particle | 111: core |
| 112: surface layer | 120: crystalline carbon-based material |
| 130: carbon layer | |
| 200: secondary particle | |

The invention claimed is:

1. A negative electrode active material, comprising a secondary particle in which primary particles are aggregated,
    wherein the primary particle includes:
    a core including one or more of silicon and a silicon compound; and
    a surface layer which is disposed on a surface of the core and contains carbon,
    wherein an average particle size $D_{50}$ of the core is in a range of 0.5 μm to 20 μm,
    wherein a porosity between the primary particles is in the range of 2% to 50% based on the total volume of the secondary particle, and
    wherein the surface layer is included at 2 to 50 parts by weight based on 100 parts by weight of the core.

2. The negative electrode active material according to claim 1, wherein the silicon compound is a silicon oxide ($SiO_x$, 0<x<2) in which silicon is dispersed in a silicon dioxide ($SiO_2$) matrix.

3. The negative electrode active material according to claim 2, wherein the silicon includes one or more of an amorphous silicon and a crystalline silicon having a crystal size of more than 0 to 30 nm or less.

4. The negative electrode active material according to claim 1, wherein the core is a porous core including a plurality of pores.

5. The negative electrode active material according to claim 4, wherein an internal porosity of the porous core is in a range of 5% to 90% based on the total volume of the porous core.

6. The negative electrode active material according to claim 1, wherein a thickness of the surface layer is in a range of 1 to 100 nm.

7. The negative electrode active material according to claim 1, wherein the average particle size $D_{50}$ of the secondary particle is in a range of 2 to 50 μm.

8. The negative electrode active material according to claim 1, wherein the secondary particle further includes a carbon layer which is disposed on a surface of the secondary particle and contains carbon.

9. The negative electrode active material according to claim 8, wherein a thickness of the carbon layer is in a range of 5 to 100 nm.

10. The negative electrode active material according to claim 1, wherein the negative electrode active material further comprises a graphite-based active material particle,
    wherein a weight ratio of the secondary particle and the graphite-based active material particle is in a range of 1:1 to 1:49.

11. A method of preparing the negative electrode active material of claim 1, comprising:
    preparing the core including one or more of silicon or a silicon compound and having an average particle size $D_{50}$ of 0.5 to 20 μm (Step 1);
    forming the surface layer containing carbon on the surface of the core to form the primary particle (Step 2); and
    forming the secondary particle by aggregating the primary particles (Step 3).

12. A negative electrode, comprising the negative electrode active material according to claim 1.

13. A lithium secondary battery, comprising the negative electrode according to claim 12.

* * * * *